United States Patent [19]

Bleakley et al.

[11] Patent Number: 5,232,678
[45] Date of Patent: Aug. 3, 1993

[54] PRECIPITATED CALCIUM CARBONATE

[75] Inventors: Ian S. Bleakley; Thomas R. Jones, both of St. Austell, United Kingdom

[73] Assignee: ECC International Limited, United Kingdom

[21] Appl. No.: 736,488

[22] Filed: Jul. 26, 1991

[30] Foreign Application Priority Data

Jul. 27, 1990 [GB] United Kingdom ................. 9016552

[51] Int. Cl.$^5$ ............................................. C01B 31/24
[52] U.S. Cl. ...................................... 423/432; 423/268
[58] Field of Search .................. 423/432, DIG. 3, 268

[56] References Cited

U.S. PATENT DOCUMENTS 2,081,112  5/1937  Statham et al. ..................... 423/432
4,157,379  6/1979  Arika et al. .......................... 423/432

FOREIGN PATENT DOCUMENTS 59-97530  6/1984  Japan .................................... 423/432

*Primary Examiner*—Michael Lewis
*Assistant Examiner*—Stuart L. Hindrickson
*Attorney, Agent, or Firm*—Klauber & Jackson

[57] ABSTRACT

The calcium carbonate is prepared by:
(a) slaking quicklime in an aqueous medium;
(b) carbonating and neutralizing the suspension of slaked lime formed in step (a) using a gas comprising carbon dioxide; and
(c) separating the precipitated calcium carbonate formed in step (b) from the aqueous medium in which it is suspended. There is added 0.01% to 15% by weight, based on the weight of dry calcium oxide, of a reagent having one or more active hydrogen atoms (or a salt thereof), to the aqueous medium in which the quicklime is slaked in step (a).

The reagent is selected from the group consisting of triethanolamine, mannitol, diethanolamine, bicine, morpholine, tri-isopropanolamine, N-ethyl diethanolamine, N,N-diethylethanolamine and sodium boroheptonate.

10 Claims, No Drawings

PRECIPITATED CALCIUM CARBONATE

The present invention concerns a process for the preparation of scalenohedral calcium carbonate suitable for use especially as a filler in papermaking or as a pigment in a paper coating composition.

BACKGROUND OF INVENTION

Since about 1920, chemically precipitated calcium carbonate has been used as a pigment or filler in the paper industry. Various chemical routes have been followed to precipitate the calcium carbonate, but the most frequently used methods are based on the double decomposition of sodium carbonate with either calcium hydroxide or calcium chloride, or on the carbonation with carbon dioxide gas of an aqueous suspension of calcium hydroxide ("milk of lime"). Double decomposition processes generally employ by-products of other chemical processes and therefore tend to yield calcium carbonate products which contain unwanted salts. The process based on the carbonation of milk of lime is performed in three stages; firstly, the calcination of raw limestone to produce calcium oxide or "quicklime"; secondly, the "slaking" of the quicklime with water to produce an aqueous suspension of calcium hydroxide; and finally, the carbonation of the calcium hydroxide with a gas comprising carbon dioxide.

In order to prepare a precipitated calcium carbonate for the paper industry, a process based upon the carbonation of milk of lime is preferred because there is no serious problem of contamination of the product with unwanted salts, and each of the three stages in the production process can be controlled to adjust the properties of the final product.

Calcium carbonate can be precipitated from aqueous solution in three different crystal forms: the vaterite form which is thermodynamically unstable, the calcite form which is the most stable and the most abundant in nature, and the aragonite form which is metastable under normal ambient conditions of temperature and pressure, but converts to calcite at elevated temperature. The aragonite form crystallises as long, thin needles having a length:diameter ratio of about 10:1, but the calcite form exists in several different shapes of which the most commonly found are the rhombohedral shape in which the length and the diameter of the crystals are approximately equal, and the crystals may be either aggregated or unaggregated; and the scalenohedral shape in which the crystals are like double, two-pointed pyramids having a length:width ratio of about 4:1, and which are generally unaggregated. All these forms of calcium carbonate can be prepared by carbonation of milk of lime by suitable variation of the process conditions.

A particularly desirable type of pigment for the paper industry is known as a "bulking pigment". The opacity and brightness of a paper sheet filled or coated with a mineral material depend on the ability of the sheet to scatter light. If the pigment consists of fine particles which are separated by small spaces or voids, the scattering effect is generally enhanced, and is found to be at an optimum when the width of the spaces or voids is about half the wavelength of visible light, or about 0.25 microns. Bulking pigments, or pigments consisting of fine particles separated by spaces or voids of about the optimum size, are desirable in the paper industry on account of their ability to scatter visible light, but if the pigment consists of discrete fine particles, the retention of these particles in a matrix of cellulosic papermaking fibres is poor. To obtain good retention, the fine particles must be aggregated together to form clusters of larger size.

High light scattering pigments currently available to the paper industry include titanium dioxide, which is very effective but also expensive, and fine kaolin particles which have been aggregated either thermally or chemically. Pigments derived from kaolin are also effective in scattering light, but are again expensive. Of the various forms of calcium carbonate, the aragonite form is effective as a high light scattering pigment but the process conditions necessary for its production are stringent and difficult to control. The rhombohedral form has crystals which are generally unaggregated and which pack together too closely and do not leave between them voids or spaces of the appropriate size. The scalenohedral form may be produced relatively inexpensively and the process conditions may be readily controlled to give aggregates of fine crystals separated by spaces of substantially the optimum size for light scattering, and is therefore the preferred form of calcium carbonate for use as a bulking pigment in the paper industry.

U.S. Pat. No. 2,081,112 (N. Statham & T.G. Leek) describes a process for producing precipitated calcium carbonate by carbonating milk of lime. It is recognised that the more violent the agitation in the gas absorber, the finer will be the product, and the aim is to create a fine mist of calcium hydroxide slurry in the presence of the carbon dioxide-containing gas. The temperature in the gas absorber is maintained at 50°-60° C., preferably around 55° C.

U.S. Pat. No. 2,964,382 (G.E. Hall, Jnr) concerns the production of precipitated calcium carbonate by various chemical routes in which calcium ions are contacted with carbonate ions in a precipitation zone, including the carbonation of milk of lime. High shear, intense turbulence is provided in the precipitation zone by means of an impeller rotating at a peripheral speed of at least 1160 feet per minute (589 cm. per second).

U.S. Pat. No. 3,320,026 (W.F. Waldeck) describes the production of different forms of calcium carbonate including the scalenohedral form. The calcium hydroxide is relatively coarse and contains at least 50% by weight of particles larger than 10 microns. The temperature in the gas absorber is maintained at less than 20° C.

U.S. Pat. No. 4,018,877 (R.D.A. Woods) describes a carbonation process in which there is added to the suspension in the gas absorber, after the calcium carbonate primary nucleation stage and before completion of the carbonation step, a complexing agent for calcium ions, such as ethylenediamine tetraacetic acid (EDTA), aminotriacetic acid, aminodiacetic acid or a hydroxy polycarboxylic acid.

U.S. Pat. No. 4,157,379 (J. Arika et al) describes the production of a chain-structured precipitated calcium carbonate by the carbonation of calcium hydroxide suspended in water in the presence of a chelating agent and a water-soluble metal salt.

U.S. Pat. No. 4,367,207 (D.B. Vanderheiden) describes a process in which carbon dioxide-containing gas is introduced into an aqueous calcium hydroxide slurry containing an anionic organpolyphosphonate electrolyte to give a finely divided precipitated calcium carbonate.

OBJECT OF THE INVENTION

It is an object of this invention to provide a method of producing a calcium carbonate bulking pigment for the paper industry which is at least as effective in light scattering as an aggregated kaolin pigment but less expensive.

SUMMARY OF INVENTION

A precipitated calcium carbonate having improved light scattering properties is prepared by a process comprising the following steps:
(a) slaking quicklime in an aqueous medium;
(b) carbonating the suspension of slaked lime formed in step (a) by passing therethrough sufficient of a gas comprising carbon dioxide to cause the pH of the suspension to fall to substantially neutral (about 7); and
(c) separating the precipitated calcium carbonate formed in step (b) from the aqueous medium in which it is suspended.

According to the present invention there is added to the aqueous medium in which the quicklime is slaked in step (a) a reagent having one or more active hydrogen atoms, or a salt thereof. The reagent is selected from the group consisting of triethanolamine, mannitol, diethanolamine, bicine, morpholine, tri-isopropanolamine, N-ethyl diethanolamine, N,N-diethylethanolamine and sodium boroheptonate.

The reagent is added to the aqueous medium in which the quicklime is slaked, rather than at a later stage, as it is thought that the enhanced scattering coefficients obtained from precipitated calcium carbonate produced by the above method are achieved as a result of this earlier addition. The presence of the reagent during the slaking operation appears to inhibit the formation of aggregates or agglomerates of the fine particles of quicklime. The aqueous suspension of slaked lime which is formed comprises fine, discrete particles of slaked lime, and carbonation of a slaked lime suspension of this type yields a precipitated calcium carbonate having desirable light scattering properties.

DETAILED DESCRIPTION OF PREFERRED EMBODIMENTS

Preferably the reagent is a polyhydric alcohol, a polyhydric phenol, a polybasic acid, a protein or a compound of the general formula:

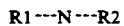

in which R1 and R2 (which may be the same or different) are each a hydrogen atom, a hydrocarbon radical having from 1 to 8 carbon atoms, a radical of the formula $-(CH_2)_p-COOM1$, where p is 1-4, and M1 is hydrogen, an alkali metal or ammonium, or a radical of the formula $-(CH_2)_q-OX$ where q is 2-5 and X is hydrogen or a hydrocarbon radical having from 1 to 8 carbon atoms; and R3 is a hydrocarbon radical having from 1 to 8 carbon atoms, a radical of the formula $-(CH_2)_p-COOM1$, where p is 1-4 and M1 is hydrogen, an alkali metal or ammonium, or a radical of the formula $-(CH_2)_q-OX$ where q is 2-5 and X is hydrogen or a hydrocarbon radical having from 1 to 8 carbon atoms or a radical of the formula $-(CH_2)_r-N[CH_2)_s-COOM2]_2$, where r and s (which may be the same or different) are each 2-5 and M2 is hydrogen, an alkali metal or ammonium. Alternatively both R2 and R3 may be replaced by a radical of the formula: $-(CH_2)_t-O-(CH_2)_t$, where t is 2-5.

The amount of the reagent used is preferably in the range from 0.01 to 15%, preferably from 0.5 to 10% based on the weight of dry calcium oxide.

In order to produce calcium carbonate in the scalenohedral form, the quicklime is preferably added to sufficient of the aqueous medium to give, on completion of step (a), a suspension having a calcium hydroxide concentration of from 0.7M to 4M (5-30% w/v). The temperature of the aqueous medium is preferably maintained in the range from 30° to 50° C. and the aqueous medium is preferably subjected to substantially continuous agitation during the slaking step. The duration of the slaking step is conveniently in the range from 15 to 30 minutes. On completion of the slaking step the suspension is preferably poured through a sieve of aperture size in the range from 40 to 70 microns in order to remove unslaked lime and other undesirable impurities.

In step (b), in order to produce calcium carbonate in the scalenohedral form, the suspension of slaked lime is preferably diluted, if necessary, to a concentration of not more than 15% w/v and maintained at a temperature in the range from 40° to 65° C. The carbonating gas preferably contains from 5% to 50% by volume of carbon dioxide, the remainder being conveniently air or nitrogen. The carbon dioxide-containing gas is preferably admitted into the suspension of slaked lime in the form of fine bubbles. This may be achieved, for example, by admitting the gas under pressure through a perforated plate gas sparger. The rate of admission of the carbon dioxide-containing gas is preferably in the range from 0.02 to 0.10 moles of carbon dioxide per minute per mole of calcium hydroxide. The suspension is preferably agitated substantially continuously throughout the carbonation step, suitably by means of an impeller rotating at a peripheral speed of at least 200 cm.s$^{-1}$ and preferably monitored throughout the carbonation step so that the admission of the carbon dioxide-containing gas may be stopped when the pH has fallen to about 7.

In step (c) the precipitated calcium carbonate is preferably separated from the aqueous medium in which it is suspended by filtration. The filter cake may then be thermally dried and milled in order to provide a substantially dry, powdered product, or alternatively the filter cake may be redispersed by means of a dispersing agent for the calcium carbonate in order to provide a concentrated aqueous suspension suitable for use, for example, in a paper coating composition.

The present invention will now be described in more detail, with reference to the following illustrative Examples.

EXAMPLE 1

A sample of quicklime prepared by calcining French limestone was added to sufficient water at 40 degrees Celsius to give, on completion of slaking, a slurry with a calcium hydroxide concentration of 1M (7.4% w/v). The water also contained 1% by weight, based on the dry weight of calcium oxide, of triethanolamine. The mixture was stirred vigorously for 25 minutes and was then poured through a No. 300 mesh British Standard Sieve (nominal aperture 53 microns) to remove any undispersed residue.

150 ml of the resulting calcium hydroxide slurry was carbonated by passing therethrough a gas containing 25% by volume of carbon dioxide in compressed air at a rate of 0.04 moles of carbon dioxide per minute per mole of calcium hydroxide. The carbonation took place in a vessel having a water jacket through which water was circulated in order to maintain a substantially constant temperature of 45 degrees Celsius within the reaction vessel. The gas containing carbon dioxide was admitted at the bottom of the reaction vessel through a perforated plate gas sparger immediately above which was a turbine impeller rotating at 2000 rpm. (peripheral speed 314 cm.per sec). The temperature and pH of the suspension in the reaction vessel were monitored and the carbonation was considered to be complete when the pH dropped to 7.0. The suspension was then filtered and the cake of precipitated calcium carbonate was remixed with water to form a suspension containing 30% by weight of dry calcium carbonate, which suspension was used to measure the Kubelka-Munk scattering coefficient, S, of the calcium carbonate by the following method:

A sheet of a synthetic plastics paper material, sold by Wiggins Teape Paper Limited under the registered trade mark "SYNTEAPE", was cut into a number of pieces each of size 10 cm×6 cm, and each piece was weighted and tested for percentage reflectance to light of 457 nm. wavelength when placed over a black background by means of an Elrepho spectrophotometer to give the background reflectance $R_b$. The preweighed pieces of plastics paper were then coated with different amounts of the suspension of precipitated calcium carbonate to give coat weights in the range from 5 to 20 g.m$^{-2}$. Each coating was allowed to dry in the air and the area of dry coating on each piece of plastics paper was standardised by placing a circular template over the coating and carefully removing surplus coating which lay outside the periphery of the template. Each piece of plastics paper bearing a coated area was then reweighed, and, from the difference in weight and the dimensions of the coated area, the coat weight X in kg.m$^{-2}$ was calculated.

Each coated area was then tested for reflectance to light of 457 nm. wavelength when the piece of plastics paper was placed (a) on a black background ($R_o$): and (b) on a pile of uncoated pieces of the plastics paper ($R_1$). Finally the reflectance to light of 457 nm. wavelength was measured for the pile of uncoated pieces alone (r).

From these measurements the reflectance Rc of the coating alone was calculated from the formula:

$$R_c = \frac{R_1 \cdot R_b - R_o \cdot r}{(R_1 - R_o) \cdot rR_b + R_b - r}$$

and the transmission $T_c$ of the coating from the formula:

$$T_c^2 = \frac{(R_o - R_c)(1 - R_c R_b)}{R_b}$$

From these two quantities it is possible to calculate a theoretical value for the reflectance, $R_\infty$, of a coating layer of infinite thickness of the same material from the formula:

$$\frac{1 - T_c^2 + R_c^2}{R_c} = \frac{1 + R_\infty^2}{R_\infty}$$

The Kubelka-Munk scattering coefficient S in $M^2.kg^{-1}$ may now be calculated from the formula:

$$SX = \frac{1}{b} \coth^{-1}\left(\frac{1 - aR_c}{bR_c}\right)$$

where $a = \frac{1}{2}\left(\frac{1}{R_\infty} + R_\infty\right)$ and $b = \frac{1}{2}\left(\frac{1}{R_\infty} - R_\infty\right)$ The scattering coefficient S was plotted against the coat weight X and the value of S for a coat weight of 8 g.m$^{-2}$ was found by interpolation. The value of S was found to be 301 m$^2$.kg$^{-1}$. The specific surface area of the calcium carbonate measured by the B.E.T nitrogen adsorption method was found to be 20.6 m$^2$g$^{-1}$.

As a comparison the experiment was repeated exactly as described above, except that no triethanolamine was added to the water in which the quicklime was slaked. In this case the value for S at a coat weight of 8 g m$^{-2}$ was found to be 200 m$^2$.kg$^{-1}$. The specific surface area of the calcium carbonate was found to be 9.8 m$^2$g$^{-1}$.

EXAMPLE 2

Example 1 was repeated except that, instead of triethanolamine, there were added to the water in which the quicklime was slaked 1%, based on the weight of dry calcium oxide, of each of the reagents listed in Table 1 (and in one case, as a control, with no reagent added). In each case a sample of precipitated calcium carbonate was prepared as described in Example 1 and the Kubelka-Munk scattering coefficient S at a coat weight of 8 g.m$^{-2}$ was measured as described above. The results are given in Table 1:

TABLE 1

| Reagent | Scattering Coefficient m$^2$ kg$^{-1}$ |
| --- | --- |
| Mannitol CH$_2$OH (CHOH)$_4$ CH$_2$OH | 269 |
| Diethanolamine HN (CH$_2$CH$_2$OH)$_2$ | 274 |
| Triethylamine N(C$_2$H$_5$)$_3$ | 240 |
| Diethylene glycol O(CH$_2$CH$_2$OH)$_2$ | 245 |
| Bicine (CH$_2$CH$_2$OH)$_2$.N.CH$_2$COOH | 283 |
| Morpholine 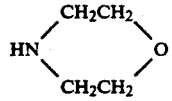 | 273 |
| Tri-isopropanolamine N(CH$_2$CHOHCH$_3$)$_3$ | 264 |
| N-ethyldiethanolamine C$_2$H$_5$N(CH$_2$CH$_2$OH)$_2$ | 261 |
| N,N-diethylethanolamine (C$_2$H$_5$)$_2$N CH$_2$CH$_2$OH | 261 |
| None | 220 |

EXAMPLE 3

Example 1 was repeated except that, instead of triethanolamine, there were added to the water in which the quicklime was slaked various percentages by weight, based on the weight of dry calcium oxide, of sodium boroheptonate. In one case, as a control, no reagent was added to the water.

In each case a sample of precipitated calcium carbonate was prepared as described in Example 1 and the Kubelka-Munk scattering coefficient S at a coat weight of 8 g.m$^{-2}$ was measured as described above. The results are given in Table 2:

TABLE 2

| % by wt. of sodium boroheptonate based on wt. of dry calcium oxide | scattering coefficient (m$^2$ kg$^{-1}$) |
| --- | --- |
| 0 | 240 |
| 0.2 | 262 |
| 0.5 | 280 |
| 1.1 | 301 |
| 1.6 | 276 |
| 2.7 | 254 |

These results show that the scattering coefficient S reaches a maximum when the dose of the sodium boroheptonate is about 1% by weight, based on the dry weight of calcium oxide.

EXAMPLE 4

Example 3 was repeated except that quicklime prepared by calcining a Belgian limestone was used. The specific surface area of the slaked lime before carbonation was measured by the BET nitrogen adsorption method. A sample of precipitated calcium carbonate was prepared from each batch of the slaked lime as described in Example 1 and the Kubelka-Munk scattering coefficient S at a coat weight of 8 g.m$^{-2}$ was measured as described above. The results are given in Table 3:

TABLE 3

| % by wt. of sodium boroheptonate based on wt. of dry calcium oxide | Surface area (m$^2$.g$^{-1}$) | Scattering coefficient m$^2$.Kg$^{-1}$ |
| --- | --- | --- |
| 0 | 15.0 | 224 |
| 0.2 | 20.1 | 233 |
| 0.5 | 28.0 | 246 |
| 1.1 | 37.1 | 269 |
| 1.6 | 44.1 | 275 |
| 2.7 | 47.7 | 207 |

These results show that although the specific surface area of the slaked lime continues to increase with increasing dose of the reagent, within the range of reagent doses which was investigated, the scattering coefficient S appears to reach a maximum at a reagent dose within the range from about 1% to about 2% by weight, based on the weight of dry calcium oxide.

EXAMPLE 5

The following is for comparative purposes only.

The experiment described in Example 1 was repeated except that no reagent was added to the water in which the quicklime was slaked. Instead there was added to the slurry of calcium hydroxide in the carbonation reaction vessel before carbonation with the carbon dioxide-containing gas was commenced, 1%, 10% and 40% by weight, respectively, based on the weight of dry calcium oxide, of triethanolamine.

In each case a sample of precipitated calcium carbonate was prepared according to the method described in Example 1 and the Kubelka-Munk scattering coefficient S at a coat weight of 8 g.m$^{-2}$ was measured and the results are set forth in Table 4:

TABLE 4

| % by weight of triethanolamine | scattering coefficient (m$^2$.kg$^{-1}$) |
| --- | --- |
| 0 | 220 |
| 1 | 217 |
| 10 | 251 |
| 40 | 240 |

Comparing these results with those obtained in Example 1, it can be seen that addition of triethanolamine at the carbonation stage, rather than the slaking stage, even at a dose of 40% by weight, based on the weight of dry calcium oxide, gave a very much smaller improvement in the scattering coefficient, compared with that which was obtained with addition of the reagent during the slaking step.

We claim:

1. A process of preparing clusters of scalenohedral calcium carbonate, which give good light scattering properties when used as a paper filler or paper coating pigment, which process comprises the following steps:
   (a) adding to an aqueous medium, either a reagent having one or more hydrogen atoms which dissociate on addition of said reagent to said aqueous medium or a salt of said reagent, said reagent being selected from the group consisting of triethanolamine, mannitol, diethanolamine, bicine, morpholine, tri-isopropanolamine, N-ethyl diethanolamine, N,N-diethylethanolamine and sodium boroheptonate;
   (b) thereafter slaking quicklime in said aqueous medium;
   (c) carbonating the suspension of slaked lime formed in step (b) by passing therethrough a sufficient amount of a gas comprising carbon dioxide to cause the pH of the suspension to fall to substantially neutral; and
   (d) separating the precipitated calcium carbonate formed in step (c) from said aqueous medium; wherein said reagent or salt of said reagent is added to said aqueous medium in an amount equal to 1%, by weight of dry calcium oxide, in said quicklime.

2. A process according to claim 1, wherein the suspension obtained in step (a) has a calcium hydroxide concentration of from 0.7 to 4M.

3. A process according to claim 1, wherein the aqueous medium in step (c) is maintained at a temperature in the range from 30° to 50° C. and subjected to substantially continuous agitation during step (a).

4. A process according to claim 1, wherein the suspension obtained in step (a), is passed through a sieve of aperture size in the range from 40 to 70 microns.

5. A process according to claim 1, wherein the suspension obtained in step (a) is diluted to a concentration of not more than 15% by weight of slaked lime and maintained at a temperature in the range from 40° to 65° C.

6. A process according to claim 1, wherein said gas contains from 5 to 50% by volume of carbon dioxide, the remainder being air or nitrogen.

7. A process according to claim 1, wherein said gas is admitted into the suspension of slaked lime in the form of fine bubbles at a rate of 0.02 to 0.10 moles of carbon dioxide per minute per mole of calcium hydroxide.

8. A process according to claim 1, wherein the suspension obtained in step (a) is agitated substantially continuously throughout the carbonation step, by means of an impeller rotating at a peripheral speed of at least 200 cm per second.

9. A process according to claim 1, wherein the pH of the suspension is monitored throughout step (b).

10. A process according to claim 1, wherein the precipitated calcium carbonate is separated from the aqueous medium in which it is suspended by filtration.

* * * * *